United States Patent
Yamamoto (10) Patent No.: US 7,499,597 B2
(45) Date of Patent: Mar. 3, 2009

(54) IMAGE PROCESSING DEVICE

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 321 days.

(21) Appl. No.: 11/169,920

(22) Filed: Jun. 30, 2005

(65) Prior Publication Data

US 2006/0001747 A1    Jan. 5, 2006

(30) Foreign Application Priority Data

Jul. 1, 2004    (JP)    ............................ P2004-195203

(51) Int. Cl.
*H04N 5/76* (2006.01)
(52) U.S. Cl. .................. 382/254; 348/231.006; 386/E5.067; 386/E5.072
(58) Field of Classification Search ................. 382/254; 348/231.6; 386/E5.067, E5.072
See application file for complete search history.

(56) References Cited

U.S. PATENT DOCUMENTS

| | | | |
|---|---|---|---|
| 5,903,707 A | 5/1999 | Sato et al. ................... | 386/121 |
| 5,943,517 A | 8/1999 | Sato ........................... | 396/429 |
| 6,943,834 B1 * | 9/2005 | Hirai ........................ | 348/231.6 |
| 7,233,350 B2 * | 6/2007 | Tay ........................... | 348/231.99 |
| 7,233,352 B2 * | 6/2007 | Matherson et al. ........... | 348/251 |
| 2003/0117504 A1 * | 6/2003 | Kurokawa et al. ........ | 348/231.6 |
| 2004/0012694 A1 | 1/2004 | Sato ........................ | 348/231.99 |
| 2004/0085462 A1 * | 5/2004 | Sasaki ...................... | 348/231.6 |
| 2004/0160521 A1 | 8/2004 | Yamamoto .................. | 348/272 |

FOREIGN PATENT DOCUMENTS

JP    2002-157163    5/2002

OTHER PUBLICATIONS

English Language Abstract of JP 2002-1571063.
U.S. Appl. No. 11/169,917 Yamamoto, filed Jun. 30, 2005.

* cited by examiner

*Primary Examiner*—Samir A. Ahmed
*Assistant Examiner*—Stephen R Koziol
(74) *Attorney, Agent, or Firm*—Greenblum & Bernstein, P.L.C.

(57) ABSTRACT

An image-processing device that performs image processes for pixel data of an image, to generate image-processed data. The amount of the image-processed data is greater than that of the pixel data, for each line of the image. The pixel data are stored in a recording area of a memory. The capacity of the recording area for one line's worth of the pixel data is coincident with a maximum amount of data in one line of the image-processed data. The pixel data are stored in the recording area such that a last pixel data in a sequentially stored series of pixel data for the one line is stored at an end address of the recording area.

9 Claims, 7 Drawing Sheets

IMAGE PROCESSING DEVICE

BACKGROUND OF THE INVENTION

1. Field of the Invention

The present invention relates to an image-processing device, which performs an image-process for pixel data of a color image to store the image-processed data in a memory.

2. Description of the Related Art

Recently, SDRAM (i.e., synchronous DRAM) has been developed, in which data can be read and written at higher speed in comparison with a DRAM, and has been used for processing color images (see Japanese patent publication No. 2002-157163). Namely, pixel data of the color image obtained from a digital camera, for example, are temporally stored in the SDRAM, and are then read out from the SDRAM to perform an image-process for the pixel data, so that image-processed data, the amount of which is greater than that of the pixel data, are stored in the SDRAM. Therefore, the SDRAM needs to have a recording area, in which both of the pixel data and the image-processed data are stored.

For miniaturizing a digital camera, electronic parts including the SDRAM have to be as small as possible. However, regarding the SDRAM, it is necessary to provide a recording area to store both of the pixel data and the image-processed data, and therefore, it is difficult to miniaturize.

SUMMARY OF THE INVENTION

Therefore, an object of the present invention is to provide an image-processing device for which the capacity of a memory such as SDRAM can be reduced.

According to the present invention, there is provided an image-processing device that performs image processes for pixel data of an image, to generate image-processed data, the amount of which is greater than that of the pixel data, for each line of the image, the image-processing device comprises a memory and a storing processor.

The memory has a recording area in which the pixel data are stored. The capacity of the recording area for one line's worth of pixel data is coincident with a maximum amount of data in one line of the image-processed data. The storing processor stores the pixel data corresponding to one line in the recording area such that a last pixel data in a sequentially stored series of pixel data for the one line is stored at an end address of the recording area.

Further, according to the present invention, there is provided an image-processing device that performs image processes for pixel data of an image to generate image-processed data, the amount of which is greater than that of the pixel data, for each line of the image, the image-processing device comprising a memory, a storing processor, and an image-processing processor.

The memory has a recording area in which the pixel data are stored, the capacity of the recording area for one line's worth of the pixel data being coincident with a maximum amount of data in one line of the image-processed data. The storing processor stores the pixel data corresponding to one line in the recording area such that a first pixel data in a sequentially stored series of pixel data for the one line is stored at a start address of the recording area. The image-processing processor reads out the pixel data in descending order of addresses of the recording area to perform the image-process to obtain the image-processed data and store the image-processed data in descending order of addresses of the recording area.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
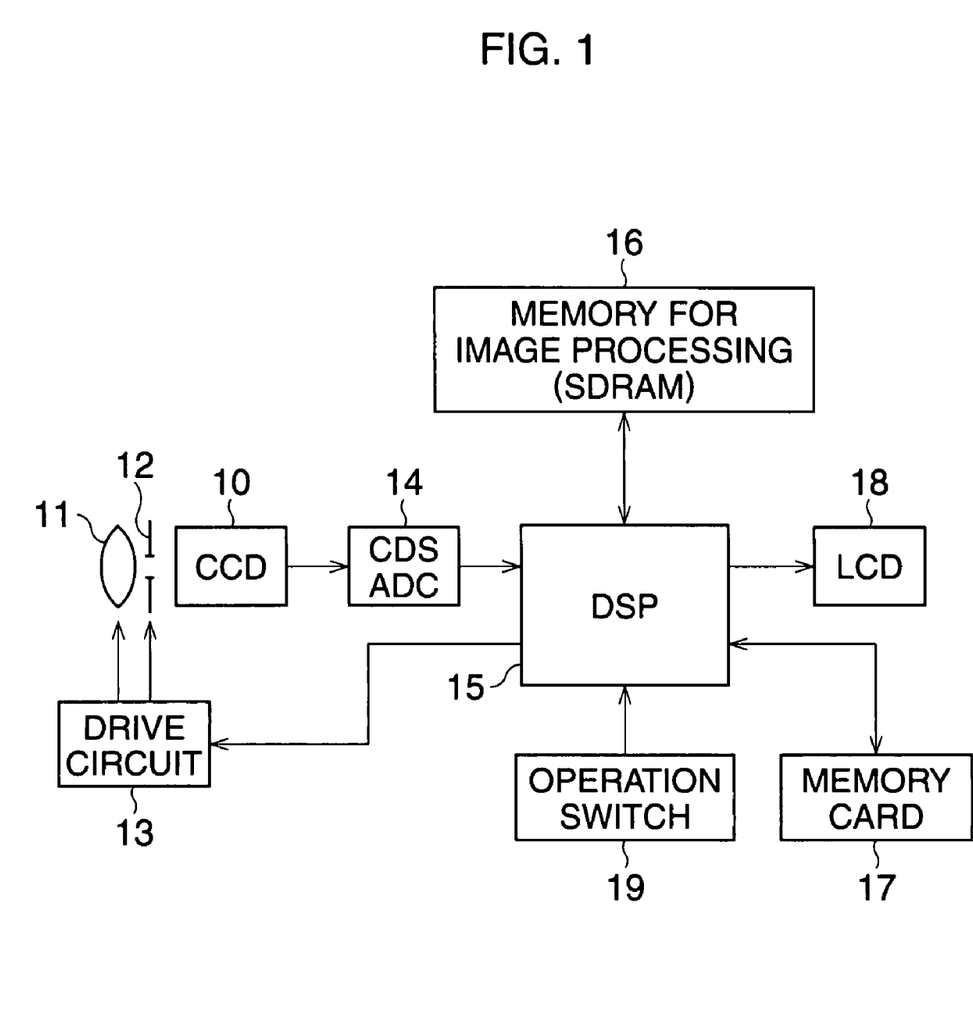
FIG. 1 is a block diagram showing a general construction of a digital camera provided with an image-processing device of a first embodiment of the present invention.

FIG. 1 is a block diagram showing a general construction of an optical device or digital camera provided with an image-processing device of a first embodiment of the present invention.

Red (R), green (G), and blue (B) color filters, which are arranged according to the Bayer matrix, are provided on a light-receiving surface of an imaging device (CCD) 10. A photographing lens 11, and a shutter 12 are disposed in front of the light-receiving surface, and are driven by a drive circuit 13. Namely, a focusing operation of the photographing lens 11 and an open-close operation of the shutter 12 are controlled by the drive circuit 13, so that, when the shutter 12 is open, a light beam passing through the photographing lens 11 enters the imaging device 10, by which a two-dimensional image obtained through the photographing lens 11 is sensed. Thus, an analogue image signal, corresponding to the image, is generated in the imaging device 10.

The image signal is input to an analogue signal processing circuit 14, provided with a correlated double sampling circuit (CDS) and an analogue-digital converter (ADC), in which a noise component is removed from the image signal, and the image signal is converted to digital pixel data (i.e., raw data). The pixel data are temporarily stored in a memory for image processing (SDRAM) 16, connected to a digital signal processing circuit (DSP) 15. The pixel data are then read out from the memory 16, and are subjected to various kinds of image processes in the digital signal processing circuit 15, and then stored in the memory 16 as image-processed data.

The image-processed data are read out from the memory 16, so that the image-processed data are subjected to an image compression, and recorded in a memory card 17 as a still image. The image-processed data of the still image are also transmitted to a monitor or liquid crystal display 18, so that a color image of the still image is indicated thereon. The image signal, read out form the imaging device 10, is directly input to the liquid crystal display 18 through the analogue signal processing circuit 14 and the digital signal processing circuit 15, so that a monitor image or moving image is indicated on the liquid crystal display 18.

An operation switch 19, for performing various kinds of operations such as a recording operation of the image-processed data to the memory card 17, is connected to the digital signal processing circuit 15.

Figure 2:
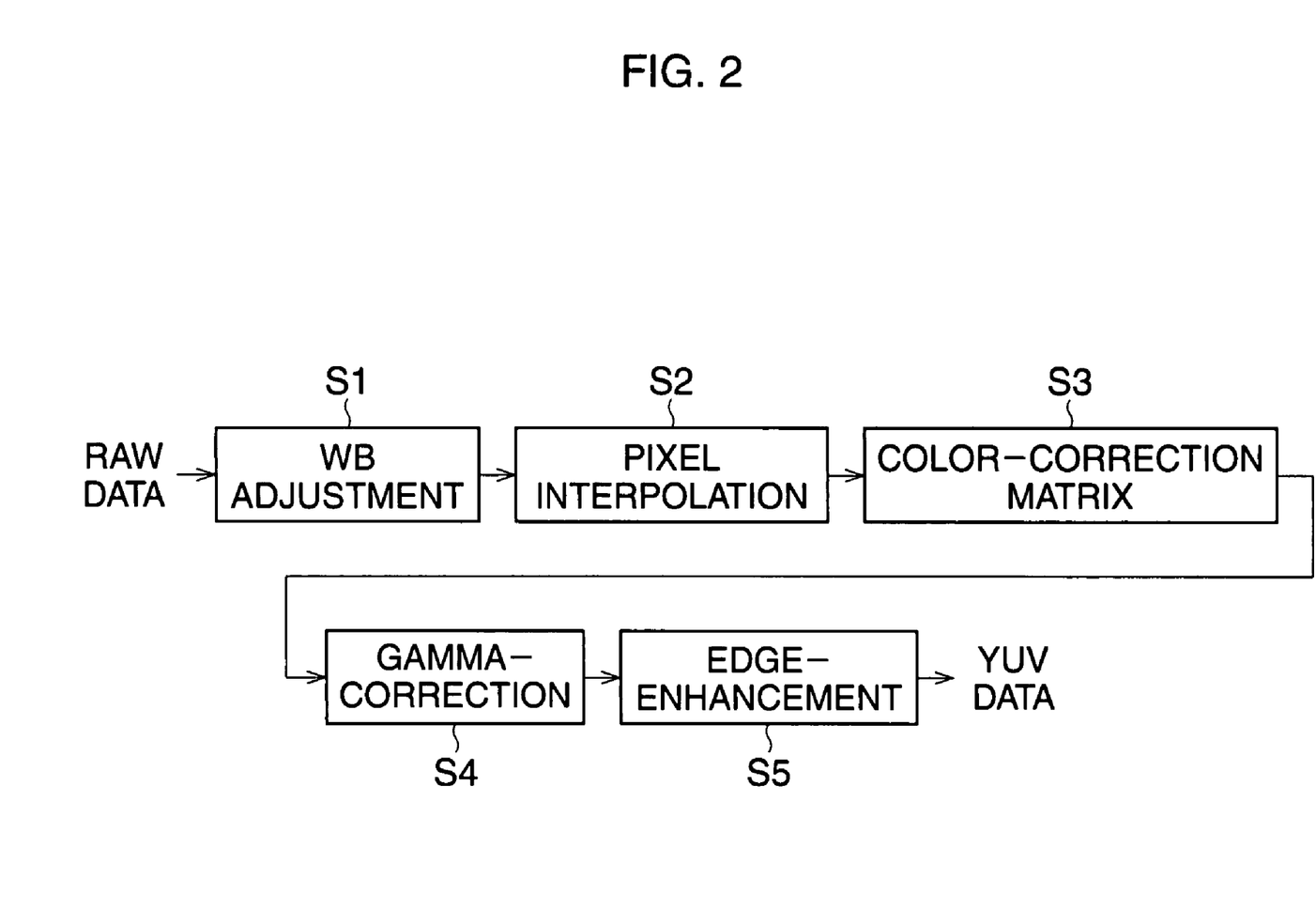
FIG. 2 is a view showing a flow of image processes performed in the digital signal processing circuit.

FIG. 2 shows a flow of image processes performed in the digital signal processing circuit 15. The pixel data (or raw data) are first subjected to a white-balance (WB) adjustment in the digital signal processing circuit 15, in Step S1. In Step S2, then, pixel interpolation is carried out. Namely, as described later, regarding a pixel, in which red (R) and blue (B) pixel data do not exist, R and B pixel data are obtained by interpolation. Similarly, regarding R pixels and B pixels, green (G) pixel data are obtained by interpolation. Thus, regarding all of the pixels, R, G, and B pixel data are obtained.

In Step S3, a color-correction matrix is applied to the pixel data obtained in Step S2, so that errors occurring because of the characteristics of the color filters are removed. In Step S4, a gamma-correction is applied to the pixel data, which have been subjected to the color-correction matrix. In Step S5, an edge enhancement is applied to the pixel data, which have been subjected to the gamma-correction. After this, RGB/YUV conversion is carried out, so that R, G, and B pixel data are converted to luminance (Y) data, and color differential data or U data (=B−Y) and V data (=R−Y). Thus, for a single pixel, luminance data, U data, and V data are generated.

Figure 3:
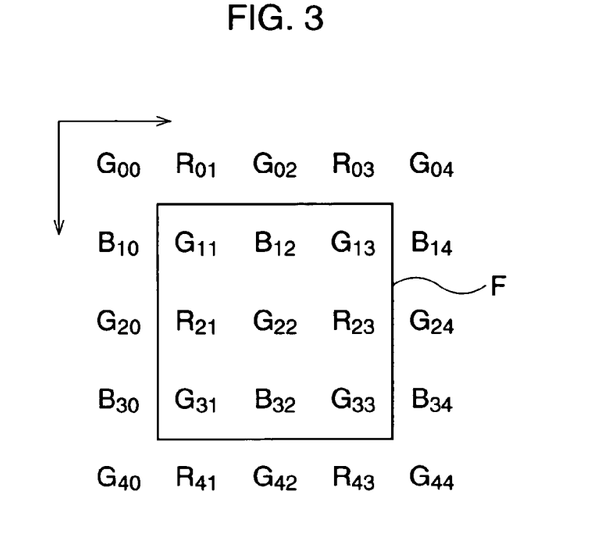
FIG. 3 is a view for explaining a pixel interpolation carried out in Step S2 of FIG. 2.

With reference to FIG. 3, the pixel interpolation carried out in Step S2 is described. In FIG. 3, the characters "R", "G", and "B" indicate red, green, and blue colors, respectively. The suffix attached to each of the characters "R", "G", and "B" indicates the coordinates of a pixel contained in a two-dimensional image formed by pixel data (raw data) that is input into the digital signal processing circuit 15. The origin of the coordinates is (0, 0), and the G pixel ($G_{00}$) is positioned at the origin. The positive direction in the horizontal line is rightward, and the positive direction in the vertical line is downward.

Regarding the pixel data of the two-dimensional image, in odd-numbered rows counted from the top, G pixels and R pixels are alternately arranged, and in even-numbered rows counted from the top, B pixels and G pixels are alternately arranged. For example, in the third row counted from the top, $G_{20}, R_{21}, G_{22}, R_{23}, G_{24}$ . . . are arranged in this order from the left to the right.

Figure 4:
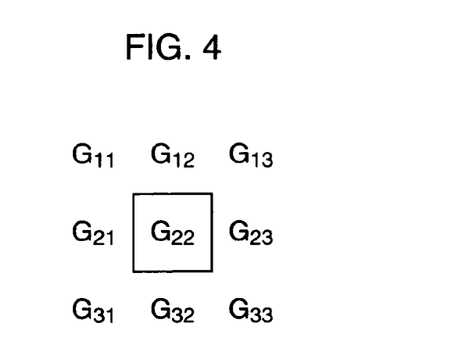
FIG. 4 is a view showing Gpixel data of pixels contained in a frame shown in FIG. 3.
Figure 5:
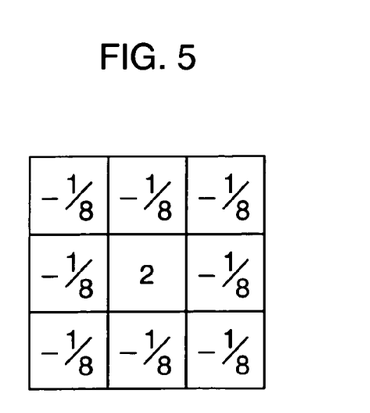
FIG. 5 is a view showing an operator for performing an edge enhancement.

Regarding G pixels, the interpolations for R pixels and B pixels are performed using pixel data of pixels, which are adjacent to the upper and lower positions thereof or right and left sides thereof. For example, R pixel data of the G pixel ($G_{11}$) is obtained by calculating the arithmetic mean of pixel data of R pixels positioned at the upper and lower positions thereof. That is, $R_{11}=(R_{01}+R_{21})/2$ B pixel data of the G pixel ($G_{11}$) is obtained by calculating the arithmetic mean of pixel data of B pixels positioned at the right and left sides thereof. That is, $B_{11}=(B_{10}+B_{12})/2$ Regarding G pixel and R pixel, the arithmetic mean of pixel data of four pixels obliquely adjacent to the G pixel or the R pixel, is calculated. For example, R pixel data of the B pixel ($B_{12}$) is $R_{12}=(R_{01}+R_{03}+R_{21}+R_{23})/4$ B pixel data of the R pixel ($R_{21}$) is $B_{21}=(B_{10}+B_{12}+B_{30}+B_{32})/4$ On the other hand, the interpolation for G pixel data is performed using pixel data of G pixels, which are adjacent to the upper and lower positions, and right and left sides thereof. For example, G pixel data of the B pixel ($B_{12}$) is obtained by calculating the arithmetic mean of pixel data of G pixels positioned at the upper and lower positions, and right and left sides thereof. That is, $G_{12}=(G_{02}+G_{11}+G_{22}+G_{13})/4$ With reference to FIGS. 4 and 5, the edge enhancement is described. FIG. 4 shows the G pixel data contained in (3×3) pixels enclosed by a frame F of FIG. 3. FIG. 5 shows an operator (i.e., filter matrix) for carrying out the edge enhancement. As understood from FIG. 5, to apply the edge enhancement to the G pixel ($G_{22}$), the following calculation is performed.

$2 \times G_{22}-(1/8) \times (G_{11}+G_{12}+G_{13}+G_{21}+G_{23}+G_{31}+G_{32}+G_{33})$ To carry out the edge enhancement for all of the (3×3) pixels enclosed by the frame F of FIG. 3, for example, it is not sufficient to use only the 16 pixels, surrounding the frame F, such as $G_{00}, R_{01}$, and $G_{02}$. For example, for applying the edge enhancement to the G pixel ($G_{11}$), G pixel data of 8 pixels surrounding the G pixel ($G_{11}$) are needed, but the edge enhancement cannot be carried out since G pixel data for $R_{01}$ and $B_{10}$ cannot be obtained, in the example of FIG. 3. Thus, for performing the edge enhancement, it is necessary to provide adjacent pixels two-deep, surrounding the object pixel. In the case of an image composed of only the pixels shown in FIG. 3, only the G pixel ($G_{22}$) can be subjected to edge enhancement.

Thus, for applying or performing the edge enhancement to a two-dimensional image, in addition to pixels contained in the two-dimensional image, pixel data of two pixels, which are positioned adjacent to outside of the upper, lower, right, and left of the complete two-dimensional image, are needed. Namely, a margin (or ring pixels) are needed besides the pixels of the two-dimensional image. Therefore, for example, in case of a two-dimensional image in which the number of pixels in a horizontal direction is H and the number of pixels in a vertical direction is V, data of ((H+4)×(V+4)) pixels are needed. In other words, image-processed data of a two-dimensional image are obtained using pixel data forming a double pixel frame surrounding the two-dimensional image.

The storage capacity, required for storing one line's worth of the pixel data of horizontal line in the memory for image processing 16, is described below.

One pixel is indicated or expressed by 12 bit data, and is treated as 2 bytes for simplifying the treatment of the pixel data in the image processes. Accordingly, the amount of pixel data (raw data) for one line is ((H+4)×2) bytes. Conversely, the image-processed data is composed of the luminance data, the U data, and the V data, as described above, and the amount of data regarding one pixel is 3 bytes. Therefore, the amount of image-processed data for one line is (H×3) bytes.

For example, when H=2048, the amount of pixel data (raw data) is (2048+4)×2=4104 bytes, and the amount of image-processed data is 2048×3=6144 bytes. Namely, the amount of image-processed data is greater than the amount of raw data, for each line of the image. In this embodiment, focusing on this point, only a recording area having the capacity to store the image-processed data is reserved in the memory for image processing 16, so that the image processing can be performed.

Figure 6:
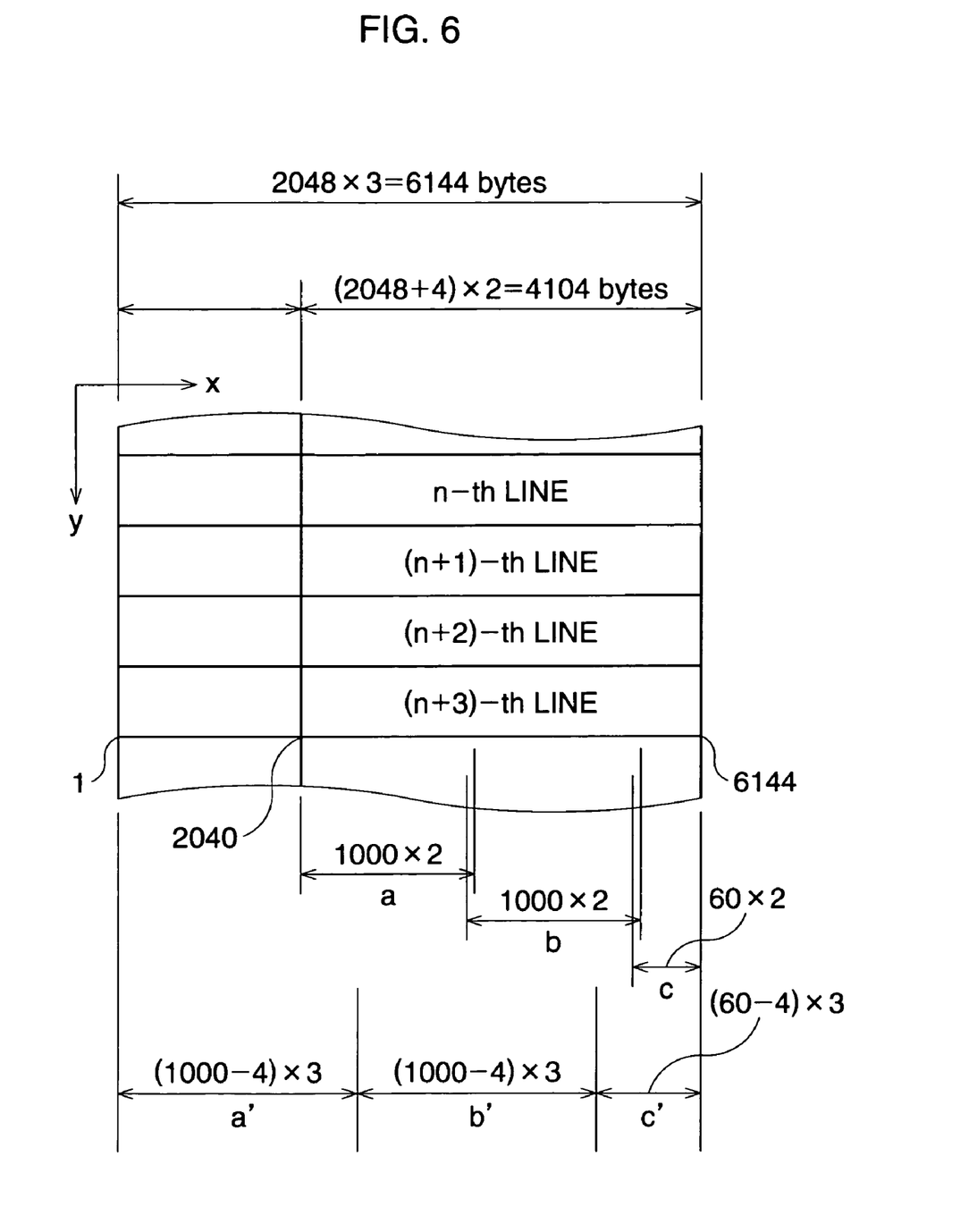
FIG. 6 is a view showing a storing state of pixel data in a memory for image processing.
Figure 7:
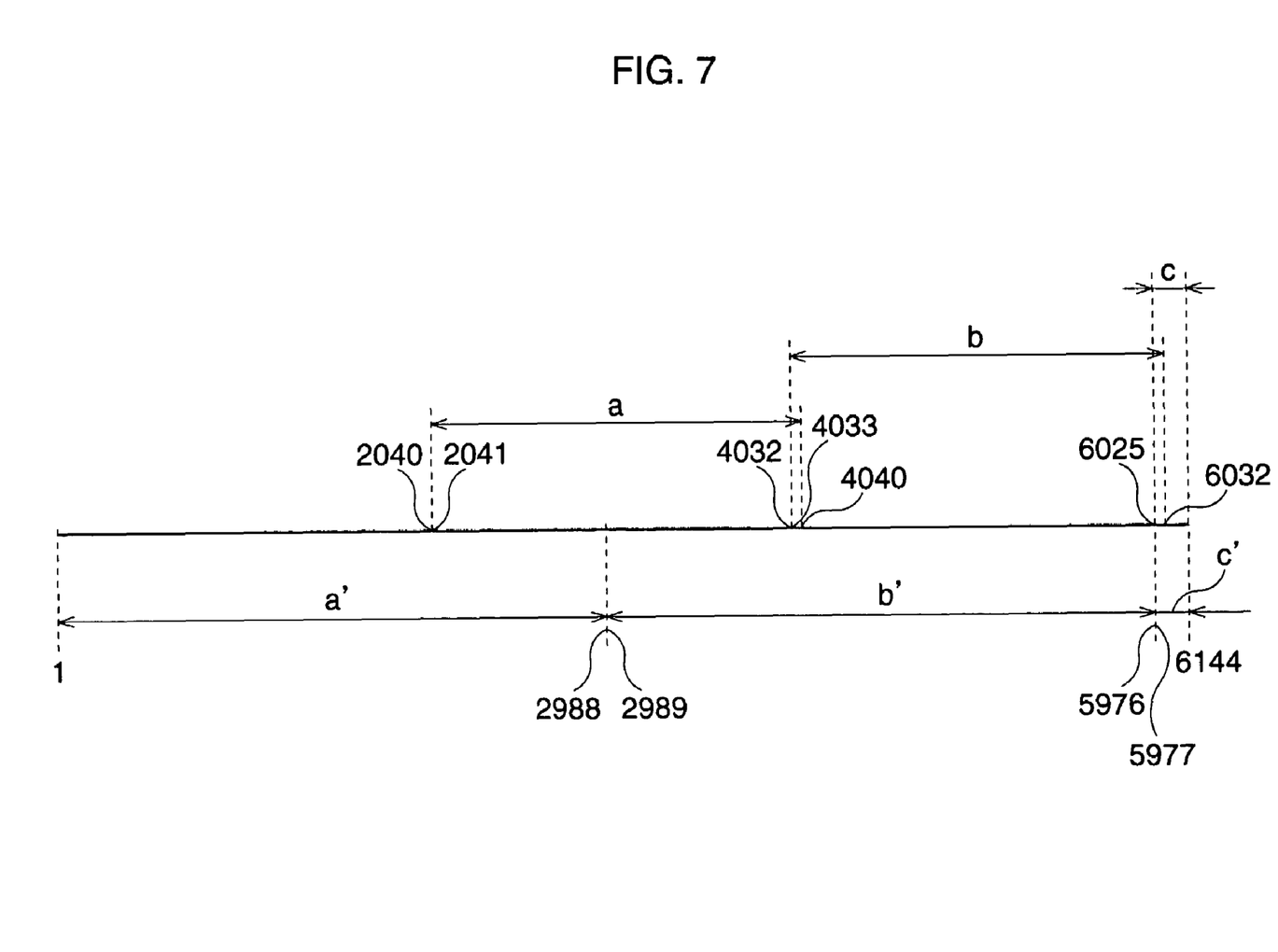
FIG. 7 is a view showing addresses at which pixel data and image-processed data are stored, regarding one line.

FIG. 6 shows a recording area in the memory for image processing 16, in which pixel data (raw data) are stored. For the simplicity of the explanation, an address (x,y) of the memory 16 corresponds to an address of the two-dimensional image. FIG. 7 shows addresses at which pixel data and image-processed data are stored, regarding one line. In FIG. 6, positions in right and left directions correspond to addresses x, and positions in up and down directions correspond to addresses y. The origin of the addresses is left and upper corner. The amount of data stored at a single address is 1 byte. Therefore, one pixel data (G pixel data, for example) is stored in two addresses, and one image-processed data (luminance data, for example) is stored in one address.

Here, it is supposed that the number of pixels H for one line extending in horizontal direction (right and left directions), is 2048. In this case, as described above, while the amount of pixel data (raw data) is 4104, the amount of image-processed data is 6144. Therefore, the capacity of the x-direction (or right and left direction) in the memory 16 is set to 6144 bytes. Namely, the capacity of the recording area for one line's worth of the pixel data is coincident with the maximum amount of data in one line of the image-processed data.

Pixel data corresponding to one line are stored in a recording area of the memory 16 such that a last pixel data in a sequentially stored series of pixel data for the one line is stored at an end address (the right edge in FIG. 6) of the recording area. Namely, the memory 16 is provided with an offset area at a side of the recording area having a smaller address, in which pixel data are not stored.

In FIG. 6, regarding address x, the offset area is defined from address 1 to address 2040, so that the pixel data are stored from address 2041 to address 6144. The capacity of the offset area is ((H×3−(H+2×A)×2) bytes, when the number of pixels of one line is H. "A" means the number of bytes required for storing one pixel data, and 2×A=4 in this embodiment. "H×3" is the amount of image-processed data of one line, and "(H+2×A)×2" is the sum of the amount of pixel data of one line and the amount of data corresponding to the number of pixels of the margin necessary to perform image processes.

Thus, the capacity of the offset area is obtained by subtracting the amount of data in the one line of the pixel data and an extra amount of data corresponding to the number of pixels necessary to perform the image processes, from the maximum amount of data in one line of the image-processed data.

For the image processes in the digital signal processing circuit 15, one line of the pixel data is divided into a plurality of short-lines. In this embodiment, image processes regarding 1000 pixels can be performed for one line in the digital signal processing circuit 15. Therefore, in the image processes, first, pixel data of the short-line "a" containing 1000 pixels, i.e., 2000 bytes from address 2041 to address 4040, are read from the memory 16, and stored in a buffer memory (not shown) provided in the digital signal processing circuit 15. Note that, in a single image process, as described later, five line's worth of pixel data aligned in a vertical direction are needed.

When performing an edge enhancement as an image process, if there are 1000 pixel data for one line, the amount of image-processed data "a'" obtained as a result of the image process is ((1000−4)×3) bytes, as described above. Therefore, the image-processed data are stored from address 1 to address 2988 in the memory 16.

Then, pixel data of the short-line "b" containing 1000 pixels subsequent to the short-line "a" are read from the memory 16, and the left-end pixels of the short-line "b" contain four pixels (i.e., 8 bytes) of the right-end of the short-line "a". Namely, the pixel data of the short-line "b" are the 2000 bytes from address 4033 to address 6032. When performing image processes on the pixel data of the short-line "b", the image-processed data "b'" of ((1000−4)×3) bytes are obtained, which are stored from address 2989 to address 5976 in the memory 16.

Lastly, pixel data of the short-line "c" containing 60 pixels subsequent to the short-line "b" are read from the memory 16, and the left-end pixels of the short-line "c" contain four pixels (i.e., 8 byte) of the right-end of the short-line "b". Namely, the pixel data of the short-line "c" are in the 120 bytes from address 6025 to address 6144. When performing image processes for the pixel data of the short-line "c", the image-processed data "c'" of ((60−4)×3) byte are obtained, which are stored from address 5977 to address 6144 in the memory 16.

Figure 8:
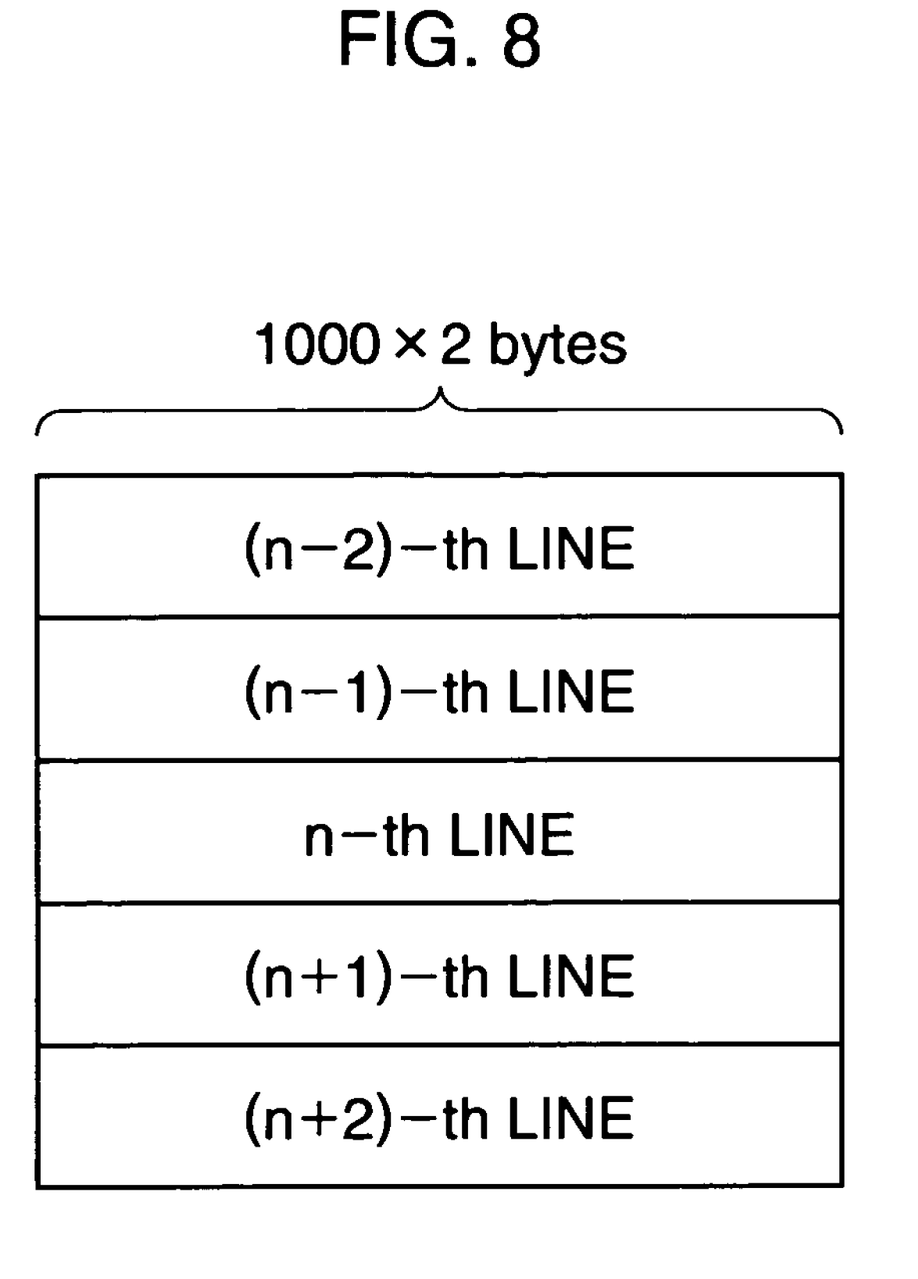
FIG. 8 is a view showing a storing state of pixel data in the buffer memory in a digital signal processing circuit.

FIG. 8 shows a storing state of pixel data (raw data) in the buffer memory in the digital signal processing circuit 15. A case, in which image processes are performed for pixel data of an n-th line in FIG. 6, is described. First, pixel data from the (n−2)-th line to the (n+2)-th line are read out from the memory for image processing 16, and stored in the buffer memory. Namely, pixel data ((1000×2) bytes) of five lines sequential in the up and down directions, contained in the short-line "a", are stored in the buffer memory.

When image-processed data of the n-th line are obtained, the image-processed data are stored in the memory for image processing 16. The pixel data of the (n−2)-th line are then deleted, and pixel data of the (n+3)-th line are read out from the memory 16 and stored in the buffer memory. After that, using pixel data from the (n−1)-th line to the (n+3)-th line, image-processed data of the (n+1)-th line are obtained.

When the operations, described above, are repeated so that the image processes are completed for all of the short-lines "a" (1536, for example), the same operations are performed for the short-lines "b", so that the image-processed data "b'" are stored in the memory 16. Then, the image processes are carried out for the short-lines "c", so that the image-processed data "c'" are stored in the memory 16.

Thus, in the embodiment, one line is divided into a plurality of short-lines "a", "b", and "c", and pixel data of the short-lines corresponding to a smaller address of the memory 16, or closer to the offset area, are first subjected to the image processes. The obtained image-processed data "a'", "b'", and "c'" are stored in the recording area starting at a first address, corresponding to the offset area, so that the image-processed data are stored starting at the first addresses of the memory and ending at the end address. Therefore, the capacity of the memory 16 is sufficient if the image-processed data can be stored, and thus, an area for storing both the pixel data and the image-processed data is not needed. Therefore, the capacity of the memory for image processing 16 can be restrained at the minimum, so that the image-processing device can be miniaturized.

Further, in the embodiment, a two-dimensional image is divided into three vertically elongated parts corresponding to the short-lines "a", "b", and "c", by straight lines extending in the vertical direction, so that image processes are carried out for each of the image parts. In each of the image parts, the margin of two-pixel width is provided at each of the right and left ends. Therefore, all of (2048×1536) pixels, for example, forming the two-dimensional image, can be subjected to the image processes, so that, when reproducing the image-processed data, a normal two-dimensional image is obtained, which does not contain a part which has not been subjected to the image processes.

Figure 9:
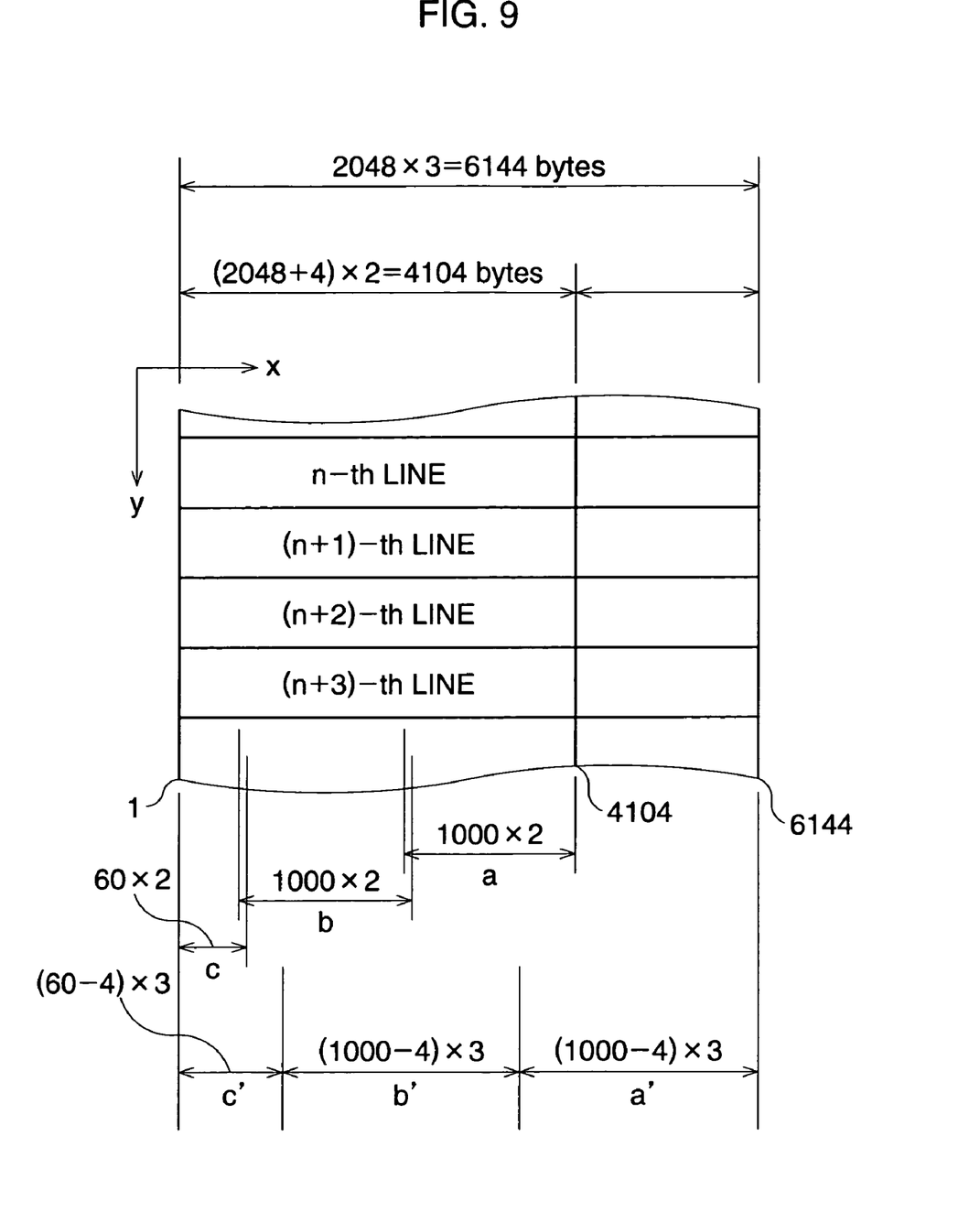
FIG. 9 is a view showing a storing state of pixel data in a memory for image processing, in a second embodiment.

A second embodiment is applied to a device, in which pixel data (raw data) corresponding to one line are stored in a recording area. In the second embodiment, a first pixel data in a sequentially stored series of pixel data for one line is stored at a start address of the recording area. In this device, the pixel data are read out in descending order of addresses of the recording area to perform the image processes to obtain the image-processed data, and the image-processed data are stored in descending order of addresses of the recording area. FIG. 9, corresponding to FIG. 6 of the first embodiment, shows a recording area in the memory for image processing, in which pixel data (raw data) are stored, in the second embodiment.

Note that, in the first and second embodiments, the raw data are defined in such a manner that two pixels are added to each of the up, down, right, and left sides of the two-dimensional image. However, depending upon the contents of the image processes, three pixels or four pixels may be added to the two-dimensional image to define the raw data.

Furthermore, in the first and second embodiments, regarding address (x,y) in the memory 16, pixel data of one line are stored for the common address y. However, it is not necessary that the address (x,y) and pixel data correspond to each other. For example, pixel data for a plurality of lines may be stored at an address y. In this case, the pixel data for each line are stored in the memory 16 at a side of address x, having a larger number, and no gaps appear between lines in the memory.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-195203 (filed on Jul. 1, 2004) which is expressly incorporated herein, by reference, in its entirety.

The invention claimed is:

1. An image-processing device that performs image processes for pixel data of an image to generate image-processed data, the amount of which is greater than that of said pixel data, for each line of said image, said image-processing device comprising:
   a memory that has a recording area in which said pixel data are stored, the capacity of said recording area for one line's worth of said pixel data being coincident with a maximum amount of data in one line of said image-processed data;
   a storing processor that stores said pixel data corresponding to one line in said recording area such that a last pixel data in a sequentially stored series of pixel data for said one line is stored at an end address of said recording area; and
   an image-processing processor that reads out said pixel data in ascending order of addresses of said recording area to perform said image processes to obtain said image-processed data, and stores said image-processed data in ascending order of addresses in said recording area,
   wherein said memory is provided with an offset area at a side of said recording area having a smaller address, said offset area being an area in which said pixel data are not stored, the capacity of said offset area being obtained by subtracting a first amount of data in said one line of said pixel data and a second amount of data corresponding to a number of pixels necessary to perform said image processes, from said maximum amount of data.

2. An image-processing device according to claim 1, wherein said one line corresponds to a horizontal line of said image.

3. An image-processing device according to claim 1, wherein said one line of said pixel data is divided into a plurality of short-lines, said short-lines corresponding to a smaller address of said memory being first subjected to said image processes and stored in said recording area starting at a first address, so that said image-processed data are stored starting at said first addresses of said memory and ending at said end address.

4. An image-processing device according to claim 1, wherein said one line of said pixel data is divided into a plurality of short-lines, one of said short-lines corresponding to an address in said memory close to an offset area, in which said pixel data are not stored, being first subjected to said image processes, so that said image-processed data are stored at an address of said memory, in which said pixel data are not stored.

5. An image-processing device according to claim 1, wherein said one line of said pixel data is divided into a plurality of short-lines, both ends of each of said short-lines being provided with pixels necessary to perform said image processes.

6. An image-processing device according to claim 1, wherein said memory comprises an SDRAM.

7. An image-processing device that performs image processes for pixel data of an image to generate image-processed data, the amount of which is greater than that of said pixel data, for each line of said image, said image-processing device comprising:
   a memory that has a recording area in which said pixel data are stored, the capacity of said recording area for one line's worth of said pixel data being coincident with a maximum amount of data in one line of said image-processed data;
   a storing processor that stores said pixel data corresponding to one line in said recording area such that a first pixel data in a sequentially stored series of pixel data for said one line is stored at a start address of said recording area; and
   an image-processing processor that reads out said pixel data in descending order of addresses of said recording area to perform said image processes to obtain said image-processed data, and stores said image-processed data in descending order of addresses in said recording area,
   wherein said memory is provided with an offset area at a side of said recording area having a greater address, said offset area being an area in which said pixel data are not stored, the capacity of said offset area being obtained by subtracting a first amount of data in said one line of said pixel data and a second amount of data corresponding to a number of pixels necessary to perform said image processes, from said maximum amount of data.

8. An image-processing method that performs image processes for pixel data of an image to generate image-processed data, the amount of which is greater than that of said pixel data, for each line of said image, said image-processing method comprising:
   defining a recording area in a memory, in which said pixel data are stored, the capacity of said recording area for one line's worth of said pixel data being coincident with a maximum amount of data in one line of said image-processed data;
   storing said pixel data corresponding to one line in said recording area such that a last pixel data in a sequentially stored series of pixel data for said one line is stored at an end address of said recording area;

reading out said pixel data in ascending order of address of said recording area to perform said image processes to obtain said image-processed data; and storing said image-processed data in ascending order of address in said recording area, wherein said memory is provided with an offset area at a side of said recording area having a smaller address, said offset area being an area in which said pixel data are not stored, the capacity of said offset area being obtained by subtracting a first amount of data in said one line of said pixel data and a second amount of data corresponding to a number of pixels necessary to perform said image processes, from said maximum amount of data.

9. An image-processing method that performs image processes for pixel data of an image to generate image-processed data, the amount of which is greater than that of said pixel data, for each line of said image, said image-processing device method:

defining a recording area in a memory, in which said pixel data are stored, the capacity of said recording area for one line's worth of said pixel data being coincident with a maximum amount of data in one line of said image-processed data;

storing said pixel data corresponding to one line in said recording area such that a first pixel data in a sequentially stored series of pixel data for said one line is stored at a start address of said recording area;

reading out said pixel data in descending order of address of said recording area to perform said image processes to obtain said image-processed data; and storing said image-processed data in descending order of address in said recording area, wherein said memory is provided with an offset area at a side of said recording area having a greater address, said offset area being an area in which said pixel data are not stored, the capacity of said offset area being obtained by subtracting a first amount of data in said one line of said pixel data and a second amount of data corresponding to a number of pixels necessary to perform said image processes, from said maximum amount of data.

* * * * *